United States Patent [19]

Haim et al.

[11] Patent Number: 5,150,235
[45] Date of Patent: Sep. 22, 1992

[54] APPARATUS FOR IMPROVING THE ANGLE OF VIEW IN A LIQUID CRYSTAL DISPLAY

[75] Inventors: Elias S. Haim; John A. Rupp, both of Glendale; Cecil W. Penn, Phoenix, all of Ariz.

[73] Assignees: Honeywell Inc., Minneapolis, Minn.; Hosiden Corporation, Osaka, Japan

[21] Appl. No.: 650,444

[22] Filed: Feb. 4, 1991

[51] Int. Cl.⁵ .......................................... G02F 1/1335
[52] U.S. Cl. ...................................... 359/68; 359/73
[58] Field of Search ............... 350/334, 339 F, 347 R; 359/73, 68

[56] References Cited

U.S. PATENT DOCUMENTS

| 4,385,806 | 5/1983 | Fergason | 350/347 R |
| 4,852,976 | 8/1989 | Suzuki | 350/339 R |
| 4,984,874 | 1/1991 | Yamamoto et al. | 350/334 |
| 5,032,008 | 7/1991 | Yamamoto et al. | 359/73 X |

FOREIGN PATENT DOCUMENTS

| 60-159823 | 8/1985 | Japan . |
| 60-159827 | 8/1985 | Japan . |
| 60-159831 | 8/1985 | Japan . |
| 61-121033 | 6/1986 | Japan . |
| 62-69234 | 3/1987 | Japan . |
| 62-127716 | 6/1987 | Japan . |
| 1050019 | 2/1989 | Japan . |

Primary Examiner—Janice A. Howell
Assistant Examiner—Ron Trice
Attorney, Agent, or Firm—Dale E. Jepsen; D. Lenkszus; A. Medved

[57] ABSTRACT

In a polychromatic liquid crystal display, apparatus and method for improving the off-axis viewing characteristics are described. The angle of view can be expanded by appropriate selection of the thickness and the birefringence parameter of the liquid crystal material as a function of the color of the liquid crystal display pixel. In order to improve further the angle of view, retardation films are used to reduce the angular dependence of the radiation. The retardation films reduce the background light leakage by compensating for the change in retardation of the liquid crystal display at angles other than normal to the display. The reduction in the background light leakage results in improved contrast ratio and chromaticity.

1 Claim, 3 Drawing Sheets

○ CIRCULAR POLARIZED LIGHT

◊ ELLIPTICALLY POLARIZED LIGHT

↕ LINEARLY POLARIZED LIGHT

APPARATUS FOR IMPROVING THE ANGLE OF VIEW IN A LIQUID CRYSTAL DISPLAY

RELATED APPLICATION

U.S. patent application Ser. No. 07/452,672, entitled "A Color Liquid Crystal Display Suitable for Avionics Applications", filed Dec. 18, 1989, invented by John A. Rupp, and assigned to the assignee of the present application is a related application.

BACKGROUND OF THE INVENTION

1. Field of the Invention

This invention relates generally to the liquid crystal displays and more particularly to liquid crystal displays for which a wide viewing angle is required.

2. Description of the Related Art

In the related art, the use of liquid crystal displays have gained increasing acceptance in a wide variety of applications as properties of the liquid crystal displays, such as resolution response, etc., have improved. The liquid crystal displays have been particularly useful in avionics wherein the amount of space available is limited and, by replacing the relatively bulky cathode ray tube display with a liquid crystal display, additional processing apparatus can be incorporated in the display.

The liquid crystal displays have, in the past, been limited by a relatively narrow field of view. This limited field of view has compromised the usefulness of liquid crystal displays particularly in the field of avionics.

The problem has been addressed in U.S. patent application Ser. No. 07/452,672 by providing that the thickness of liquid crystal material be at a minimum of optical transmission. This minimum will be a function of the wavelength of light transmitted therethrough. The thickness of the liquid crystal material through which the radiation passes is then made smaller than the thickness at which the transmission minimum is found. In this manner, the minimum for the radiation is found at an angle with respect to an axis through the liquid crystal, i.e., because of the increased path. While unwanted radiation transmission can occur on axis, the net result is that the contrast ratio provides a suitable viewing over a wider angle of view. For a color display, each optical component will have a different optimal thickness of liquid crystal material. This type of display is typically described as a "multi-gap" liquid crystal display.

However, another problem was not addressed by the thickness of the liquid crystal cell is the angular dependence of the off-axis transmitted radiation. At an off-axis angle, as a display is rotated, an image can become blurred and difficult to view for certain angles. This image degradation is a result of the change in the birefringence parameter of the liquid crystal material and the optical path length through the liquid crystal material. The image degradation is important for displays in which the liquid crystal cells are relatively thick. U.S. Pat. No. 4,385,806 by Fergason describes a technique involving the use of retardation plates for use in liquid crystal displays in which the effects angular dependence of the display can be reduced. However, the display described by the Fergason reference is a monochromatic display and the problems related to color displays are not addressed.

A need has been felt for a display in which both the angle of view and the angular dependence of a polychromatic liquid crystal display can be achieved.

FEATURES OF THE INVENTION

It is an object of the present invention to provide an improved liquid display.

It is a feature of the present invention to provide an improved polychromatic liquid crystal display.

It is yet another feature of the present invention to provide a polychromatic liquid crystal display having a wide viewing angle.

It is a further feature of the present invention to provide a liquid crystal display to provide a wide viewing angle relative to an axis of the display having a uniform angular dependence.

It is a still further feature of the present invention to provide retardation plates to compensation for birefringence of the liquid crystal material.

It is yet a further feature of the present invention to compensate for axial asymmetry in a liquid crystal display resulting from the birefringent properties of the liquid crystal material.

SUMMARY OF THE INVENTION

The aforementioned and other features are attained, according to the present invention, by reducing the thickness of the liquid crystal cell associated with each pixel color component below the thickness for the first minimum in a liquid crystal display for parallelly oriented linear polarizing elements. By selecting the thickness of the liquid crystal material through which the optical radiation passes, the uniformity of optical radiation as function of angle relative to the axis can be increased. Two retardation plates, a first retardation plate aligned parallel to the linear polarizing elements and a second retardation film aligned perpendicularly to the linear polarizing elements and positioned in the optical path after transmission of the radiation through the liquid crystal material increase the homogeneity of the off-axis radiation.

These and other features of the invention will be understood upon reading of the following description along with the drawings.

DESCRIPTION OF THE PREFERRED EMBODIMENT

1. Detailed Description of the Figures

Figure 1:
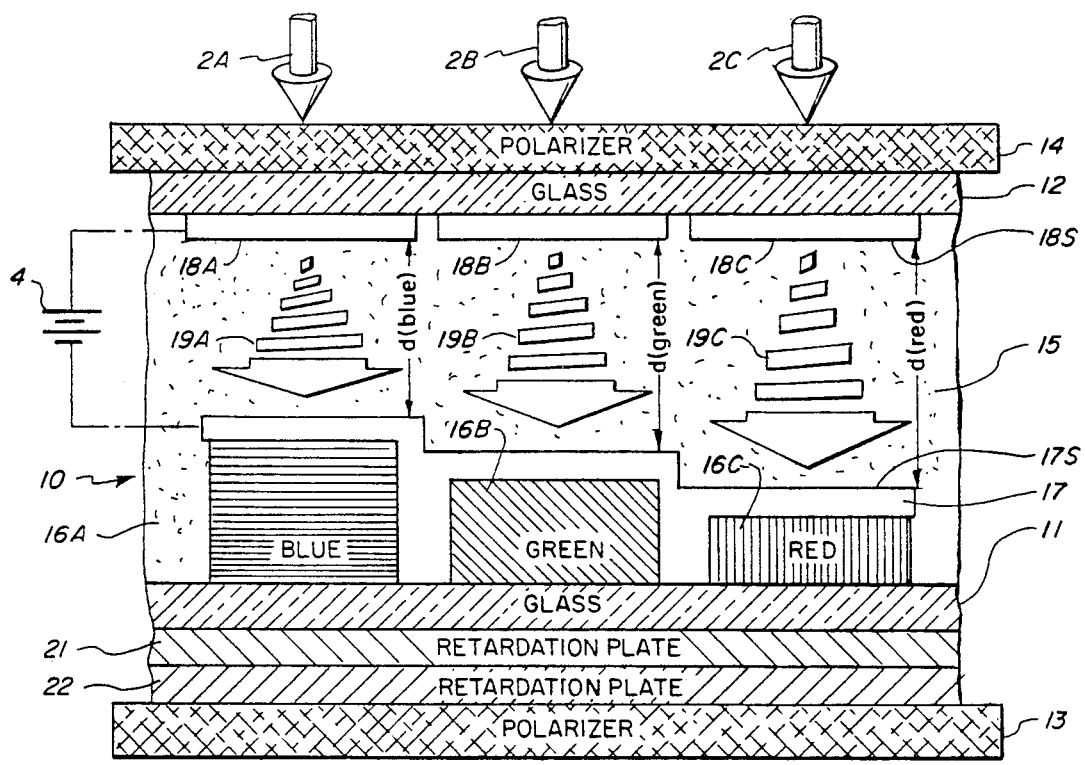
FIG. 1 is a cross-sectional view of the a liquid crystal display panel according to the present invention.

Referring now to FIG. 1, a cross-sectional view of the liquid crystal display according to the present invention is shown. Optical radiation from a radiation source is applied to the liquid crystal display unit. The applied optical radiation 2A, 2B, and 2C, is typically from a single source, but is shown in FIG. 1 in terms of the component units of a display pixel. The optical radiation passes through linear polarizer 14. The optical radiation is then applied to the liquid crystal cell 10. The liquid crystal cell 10 is bounded by two glass substrates, 12 and 11. On the interior surface of glass substrate 12 are transparent conducting regions 18A, 18B, and 18C. These conducting regions are electrodes for applying an electric field to the liquid crystal materials of each color component unit of the display pixel. A blue optical filter 16A, a green optical filter 16B, and a red optical filter 16C are coupled to a second glass substrate. Deposited on the optical filters is a transparent conducting material 17 which acts as the second electrode for each color component unit of the liquid crystal pixel. A power supply 4 is provided to illustrate that a potential can be applied to the liquid crystal material 15 which occupies the region between the electrodes 18A, 18B, and 18C and the electrode 17. As will be clear to those familiar with liquid crystal displays, the power supply 4 is typically replaced by addressing circuitry for applying a predetermined voltage to each of the color component unit electrodes. In this manner, an image can be displayed. The optical radiation 19A, having been linearly polarized, is rotated during transmission through the liquid crystal material between electrode 18A and electrode 17. The linearly polarized optical radiation 19B and 19C polarized optical radiation 19B and 19C are similarly rotated in different color component units of the pixel. Axis of the liquid crystal display is generally linearly polarized. The optical radiation, after transmission through the liquid crystal material passes through one of the optical filters 16A, 16B, and 16C. The optical filters select the color components to be transmitted by the color component unit of the liquid crystal pixel. After transmission through the liquid crystal cell, the optical radiation is transmitted through the retardation plate 21 and retardation plate 22. Finally, the optical radiation is transmitted through linear polarizer 13, and subsequently to an observer viewing the display. The distance between conducting electrode 18A and conducting electrode 17, the distance between the conducting electrode 18B and conducting electrode 17, and the distance between conducting electrode 18C and conducting electrode 17 are different in the preferred embodiment as will be discussed below.

Figure 2:
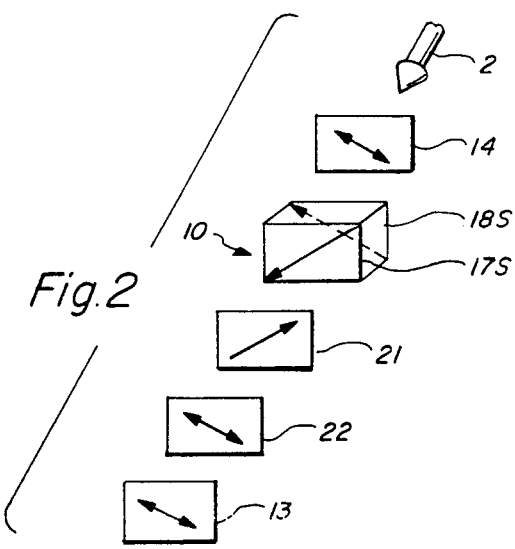
FIG. 2 is a schematic diagram illustrating the optical orientations of the components of the liquid crystal display panel of FIG. 1.

Referring next to FIG. 2, the relative optical orientations of the components of the liquid crystal display panel of FIG. 1. The incoming radiation 2 is first transmitted through linear polarizer 14. The next optically oriented region through which the optical radiation passes is the surface 18S of the conducting plates with which the liquid crystal material is in contact. The surface 18S has an orientation parallel to the linear polarizer 14. Ignoring for purposes of this discussion the controllable orientation of the actual liquid crystal material, the next optically oriented region through which the optical radiation is transmitted is the surface 17S of the conducting electrode 17, the second surface to which the liquid crystal material is exposed. The surface 17S is oriented perpendicular to the surface 18S to which the liquid crystal is exposed. The retardation plate 21 is oriented parallel to the orientation of the surface 17S, while retardation plate 22 is oriented at right angles to the orientation of retardation plate 22. Finally, the optical radiation is transmitted through linear polarizer 13 which is oriented parallel to retardation plate 22 and parallel to linear polarizer 14.

Figure 3:
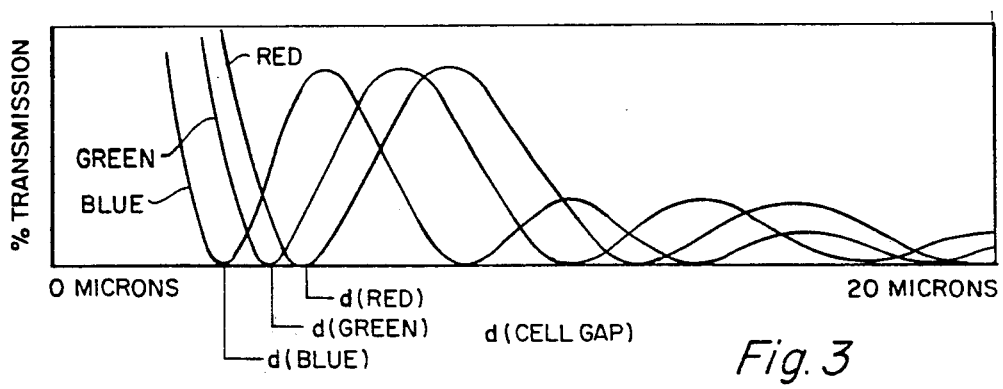
FIG. 3 displays the percent transmission of generally monochromatic light through a liquid crystal cell as a function of cell thickness for radiation having various wavelengths.

Referring next to FIG. 3, the percent optical transmission through a liquid crystal cell in the absence of applied electric field as a function of distance in the liquid crystal material through which the optical radiation travels is illustrated for the typical color components. For substantially no transmission of optical radiation, the minimum for blue radiation occurs at approximately a thickness of the liquid crystal material d(blue), the minimum for green radiation occurs at a thickness of liquid crystal material of d(green)>d(blue), and the minimum for red radiation occurs at a thickness of liquid crystal material of d(red)>d(green). This difference in the minima of the transmitted radiation is the reason that the thickness of liquid crystal for each radiation component is different in FIG. 1.

Figure 4:
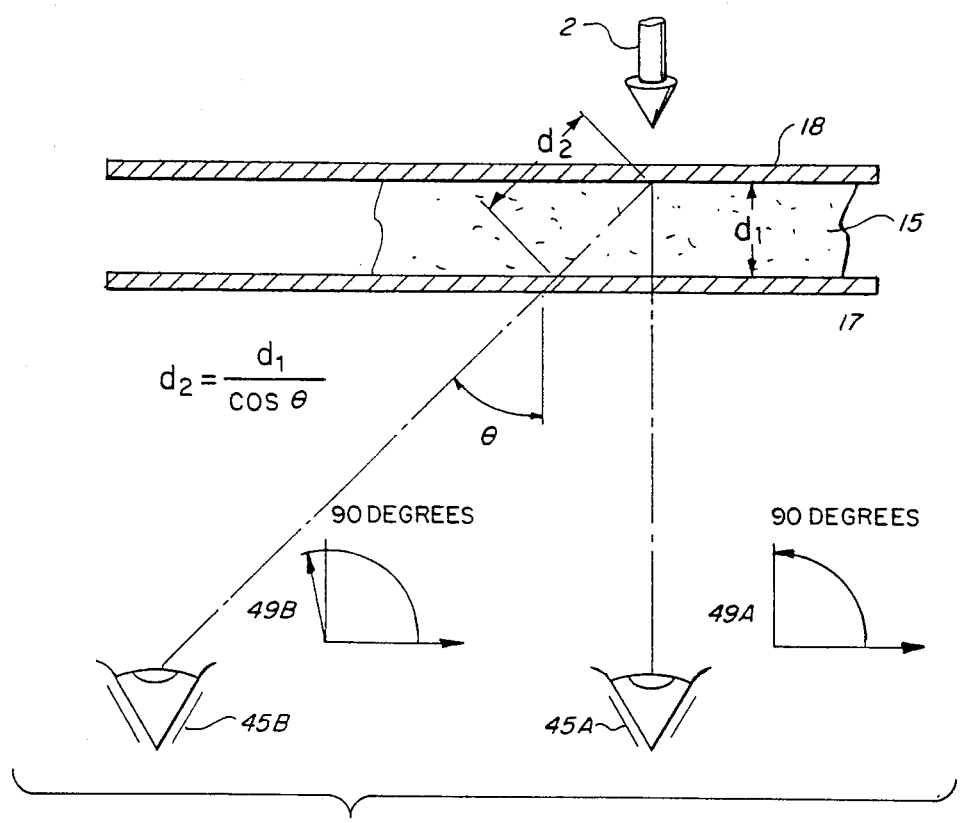
FIG. 4 illustrates the origin of off-axis radiation for a thickness of liquid crystal material equal to a first minimum of the radiation component.

Referring next to FIG. 4, the reason for the angular dependence of transmitted radiation when the thickness $d_1$ of liquid crystal material is a first minimum. An observer 45A, viewing the transmitted radiation on axis, observes radiation that has been rotated 90° (as shown in plot 49A). Because of the parallel linear polarizers (13 and 14 of FIG. 2), substantially no radiation will be transmitted. However, for an off-axis path through the liquid crystal material, the distance $d_2 = d_1/\cos\theta > d_1$. As shown in plot 49B, the angle of rotation of the transmitted radiation will be greater than the minimum and transmitted radiation will be observed by an observer 45B.

Figure 5:
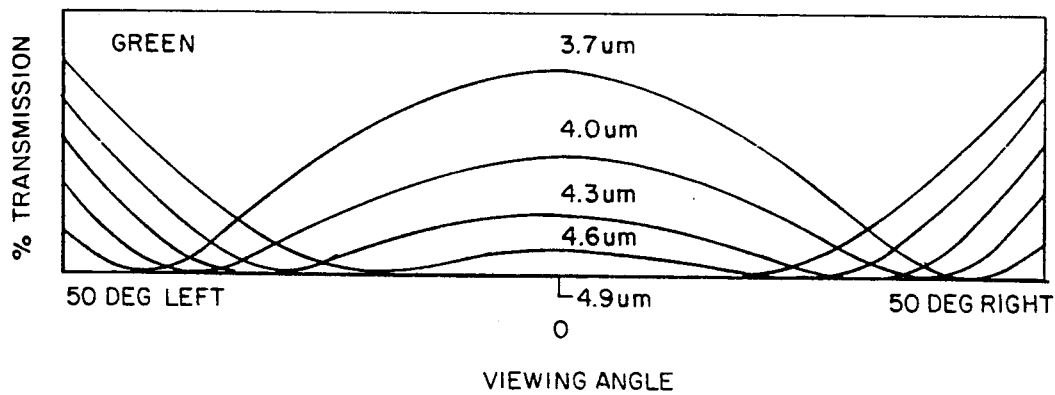
FIG. 5 displays the percent transmission of optical radiation as a function of viewing angle for a plurality of liquid crystal cell thicknesses.

Referring to FIG. 5, a technique for improving the off-axis homogeneity of transmitted radiation for a liquid crystal display is illustrated. In essence, the thickness of the liquid crystal material through which the radiation component is transmitted is not adjusted for the minimum on-axis transmission, but is adjusted to be less than the first minimum. With this thickness of liquid crystal material, the minimum radiation will be found an off-axis angle which is a function of the liquid crystal material thickness. An observer, viewing the display on-axis, will find a small amount of transmitted radiation. Although this transmitted radiation results in decreased contrast with respect to an image viewed on-axis, an increase in image contrast is provided for off-axis observation.

Figure 6A:
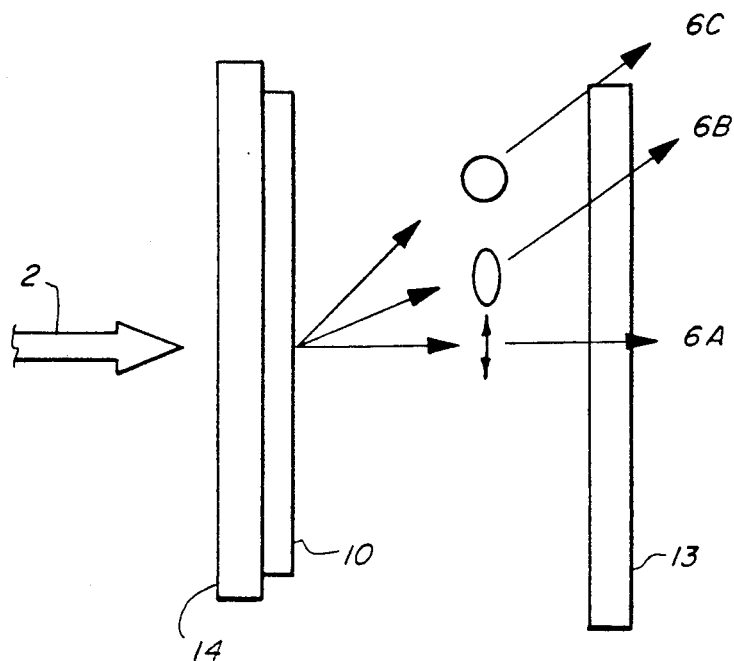
FIG. 6A and FIG. 6B illustrate the effect of insertion of the retardation plates in the optical path.
Figure 6B:
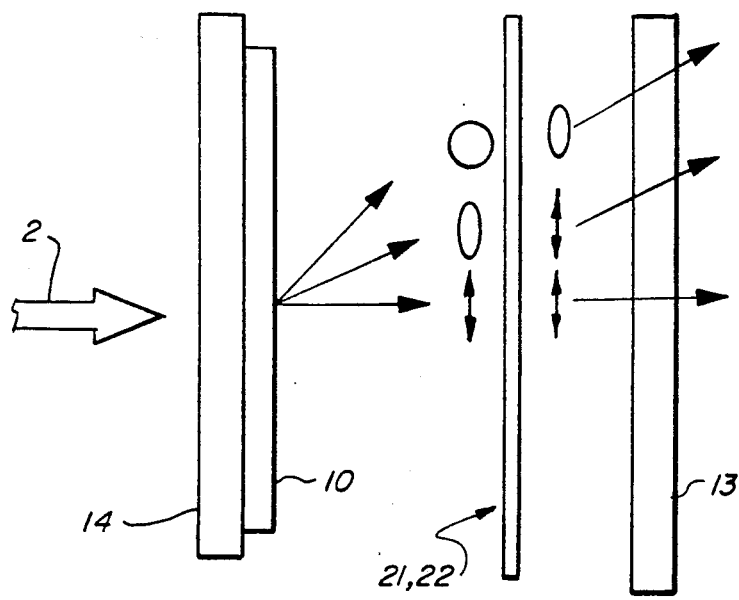

Referring next to FIG. 6A, the effect of varying the thickness of the liquid crystal material through which each band of optical radiation of a display passes is shown. The incoming radiation 2 is transmitted through the linear polarizer 14 and then through the liquid crystal cell 10. By selecting the thickness of the liquid crystal material through which a band of radiation passes to be less than the thickness of the transmission minimum distance, less radiation is observed at an off-axis angle (i.e., radiation 6C), while the radiation on-axis (i.e., radiation 6A) is increased. The net result is greater uniformity of radiation intensity as a function of angle relative to the axis. However, the off-axis transmission becomes increasingly elliptically polarized with angle, a result of the birefringence of the liquid crystal material. The result of this elliptical polarization is a non-uniformity of radiation intensity as a function of angle about the axis after transmission of the radiation through the linear polarizing plate 13. In order to compensate for the non-uniformity, the retardation plates 21 and 22 are interposed between the liquid crystal cell 10 and the linear polarizer 13 as indicated in FIG. 6B. The presence of the retardation plates 21 and 22 results in a decrease in the elliptical polarization of the radiation applied to the linear polarizer plate 13. Consequently, the uniformity of the radiation transmitted through the linear polarizing plate 13 is more uniform.

2. Operation of the Preferred Embodiment

The present invention provides a technique for increasing the usable off-axis viewing angle of a liquid crystal display. The technique involves the combination of two procedures. The first procedure, the selection of the thickness in the liquid crystal material through which the optical radiation is transmitted, results in a greater uniformity of radiation as a function of angle relative to the axis. However, the radiation which is viewed off-axis can have a component due to the birefringent nature of the liquid crystal material that is non-uniform about the axis of the liquid crystal display and which can result in reduced contrast of the image. In order to reduce the non-uniformity about the axis of the liquid crystal display, the retardation plates are interposed between the liquid crystal cell and the exit linear polarizing plate. The retardation plates reduce the elliptical polarization and increase the uniformity of the observed radiation. With this technique, liquid crystal displays can be used in applications, such as cockpit displays, in which the viewing from a relatively large off-axis angle is required.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A liquid crystal display for displaying a polychromatic image, said display comprising:
    a first linear polarizer;
    a plurality of liquid crystal pixels, each liquid crystal pixels having an optical path including:
        an optical filter for transmitting a preselected band of optical radiation;
        a first and a second conducting layer; and
        liquid crystal material between said first and said second conducting layers;
    a first retardation film;
    a second retardation film; and
    a second linear polarizer;
wherein distances between said first and said second conducting layers are determined by said preselected band of optical radiation and wherein each of said distances are selected to be less than the distance for the first minimum for transmission of said preselected band of optical radiation.

* * * * *